United States Patent [19]

MacInnis et al.

[11] Patent Number: 5,914,725
[45] Date of Patent: Jun. 22, 1999

[54] INTERPOLATION OF PIXEL VALUES AND ALPHA VALUES IN A COMPUTER GRAPHICS DISPLAY DEVICE

[75] Inventors: Alexander G. MacInnis, San Carlos; Jiann-Tsuen Chen, Cupertino, both of Calif.

[73] Assignee: PowerTV, Inc., Cupertino, Calif.

[21] Appl. No.: 08/612,105

[22] Filed: Mar. 7, 1996

[51] Int. Cl.[6] .................................................. G06T 11/00
[52] U.S. Cl. ............................................................ 345/441
[58] Field of Search .......................... 395/143, 131–133, 395/141; 345/426–439, 441–443

[56] References Cited

U.S. PATENT DOCUMENTS

| | | | |
|---|---|---|---|
| 4,484,188 | 11/1984 | Ott | 345/132 |
| 4,694,490 | 9/1987 | Harvey et al. | 380/20 |
| 4,704,725 | 11/1987 | Harvey et al. | 380/9 |
| 4,857,992 | 8/1989 | Richards | 348/396 |
| 4,947,260 | 8/1990 | Reed et al. | 358/447 |
| 4,965,825 | 10/1990 | Harvey et al. | 380/9 |
| 4,989,096 | 1/1991 | Webb et al. | 358/298 |
| 5,025,394 | 6/1991 | Parke | 345/475 |
| 5,097,257 | 3/1992 | Clough et al. | 345/132 |
| 5,109,348 | 4/1992 | Pfeiffer et al. | 345/505 |
| 5,109,414 | 4/1992 | Harvey et al. | 380/9 |
| 5,138,452 | 8/1992 | Soloff | 348/581 |
| 5,161,016 | 11/1992 | Kim | 348/575 |
| 5,233,654 | 8/1993 | Harvey et al. | 380/20 |
| 5,335,277 | 8/1994 | Harvey et al. | 380/20 |
| 5,406,306 | 4/1995 | Siann et al. | 345/115 |
| 5,446,804 | 8/1995 | Allebach et al. | 382/298 |

OTHER PUBLICATIONS

"Compositing, Part I: Theory", by James F. Blinn, IEEE Computer Graphics & Applications, Sep. 1994.

*Primary Examiner*—Almis R. Jankus
*Attorney, Agent, or Firm*—Kenneth M. Massaroni; Kelly A. Gardner; Hubert J. Barnhardt, III

[57] ABSTRACT

Interpolating a low or medium resolution image to a higher resolution image using a pixel replication and averaging technique. An overlay image having pixels of a first display resolution and a plurality of alpha blending values each indicating the degree of blending with a background image is interpolated to the resolution of the background image. In addition to interpolating pixel values, alpha blending values are themselves interpolated and multiplied by corresponding overlay pixel values prior to being blended with the background image.

35 Claims, 10 Drawing Sheets

INTERPOLATION OF PIXEL VALUES AND ALPHA VALUES IN A COMPUTER GRAPHICS DISPLAY DEVICE

RELATED APPLICATION

This application is related in subject matter to the following copending, commonly owned application filed concurrently herewith: "Blending of Video Images in a Home Communications Terminal", Ser. No. 08/612,162 pending. The aforementioned application is incorporated by reference herein.

BACKGROUND OF THE INVENTION

1. Technical Field

This invention relates generally to techniques for interpolating pixel values in a computer graphics display. More particularly, the invention provides an efficient method for increasing the apparent display resolution in terminals such as those used in subscription television systems.

2. Related Information

In subscription television systems, an encoded television signal is usually decoded and formatted for display on a television screen by a device commonly referred to as a "set-top terminal". Such terminals have been equipped in recent years with additional capabilities, such as the ability to provide video games which display computer-generated graphics images on the television screen.

When used for displaying computer graphics, such terminals generally format the graphics according to one or more video display standards, such as 320×240 pixels or 640×480 pixels. The use of a medium resolution display image (e.g., 320×240 pixels) increases graphics performance and reduces memory requirements for video games and other high performance applications which require substantial pixel manipulation, because fewer pixels must be manipulated and stored. However, a medium resolution image is inferior for display purposes, and it is preferable to display images at a higher resolution (e.g., 640×480 pixels). Accordingly, it is desirable to generate and manipulate graphics images in a low or medium resolution format and then "upscale" the image to a higher resolution for display.

The prior art provides various techniques for increasing the resolution of a video display by forming additional scan lines. For example, U.S. Pat. No. 4,484,188 to Ott, entitled "Graphics Video Resolution Improvement Apparatus", discloses a system which increases the resolution of a video image by forming additional scan lines by combining adjacent scan lines. The technique improves both the horizontal resolution and vertical resolution by generating interpolation scan lines. However, such systems require relatively complicated circuits, thus driving up the cost of terminals equipped with such circuits.

Conventional computer graphics display systems often include the ability to overlay an image onto background video. For example, sports scores may be superimposed at the bottom of a moving image of a football game. In such systems, each pixel can be rendered in one of three ways: opaque (every pixel takes on the value of the overlaid image only); translucent (the overlaid image and background image can be blended so that the background image can be "seen through" the overlay); or as transparent (only the background image is displayed).

As another example, a graphical control object such as a volume control indicator may be superimposed over a live video image on a television display. As shown in FIG. 1A, for example, a live video image 101 may be combined with a volume control indicator 102 in such a manner that the resulting image 103 includes both images; i.e., the user can see two layers of screen images: the live video that was visible before the overlay, and the overlaid image itself.

In order to control the amount of blending in the aforementioned examples, conventional systems typically allocate a plurality of additional bits for each pixel which indicate the degree to which the pixels from the overlay and background will be blended. For example, a group of such "blending" bits for each pixel can be multiplied with the overlay pixel value before being combined with the background image, thus controlling whether the overlay portion or the background image will dominate the resultant image.

As shown in FIG. 1B, for example, each pixel value 104 in an overlay image 102 may have associated therewith a "blending" factor 105 (comprising a plurality of bits) which is multiplied by the overlay pixel value in order to blend the overlay with the background image pixel 106 to produce a resultant pixel 108. These operations can be used to produce a blended image such as image 103 of FIG. 1A.

A conventional formula used to blend an overlay image and a background image for each pixel of a display is given by the following equation:

$$\alpha*(\text{overlay pixel value})+(1-\alpha)*(\text{background pixel value}),$$

where $\alpha$ represents the blending value associated with each pixel in the overlay image and "*" indicates multiplication. For a red-green-blue (RGB) pixel value comprising 16 bits (5 red, 6 green, 5 blue), each color component is separately blended to produce the resultant image.

A difficulty arises, however, if a lower resolution image is interpolated to a higher resolution ("upscaled"). If an overlay image comprising pixels each having an associated group of "blending" bits is upscaled for display by interpolating the pixel values, and then combined with a background image, the resulting image will be degraded. For example, if an overlay pixel is transparent but an adjacent overlay pixel is opaque, an interpolation between the two overlay pixels will result in an erroneous display value. This is because with conventional methods the interpolated pixel will be a blend of the opaque (visible) value and the transparent (invisible) value, while the interpolated blending value will be an average of (in this case) 1 (opaque) and 0 (transparent). The interpolated blending value is thus correct, but the interpolated pixel will be incorrect, since one of the components is intended to be completely invisible. In a specific example, the transparent pixel may have a color that is bright and irritating, while the visible pixel may be dark and subtle. The interpolated value will be a blend of these, while the desired interpolated value will be dark and subtle. Accordingly, conventional techniques of blending images cannot be used in conjunction with video upscaling.

SUMMARY OF THE INVENTION

The present invention solves the aforementioned problems by providing a low-cost technique for increasing the resolution of a display image, and for accommodating so-called alpha "blending bits" for upscaled images. The invention interpolates pixel values horizontally and vertically using a pixel replication and shifting scheme, and interpolates not only the pixel values but also the alpha blending values.

Other features and advantages of the invention will become apparent through the following detailed description, drawings, and the appended claims.

DETAILED DESCRIPTION OF THE PREFERRED EMBODIMENTS

Figure 1A:
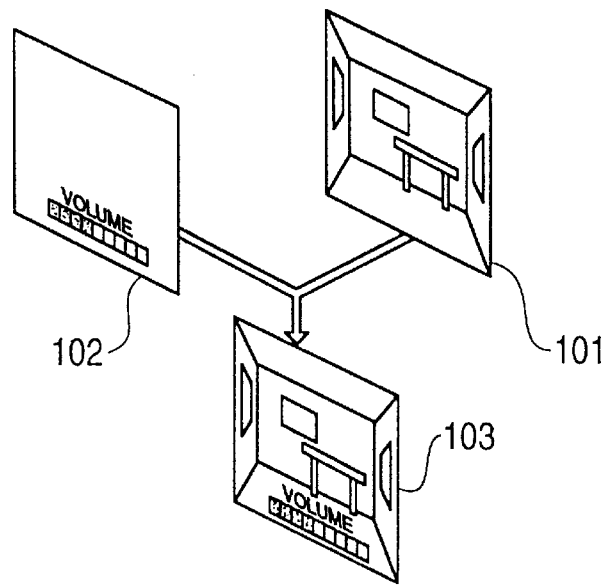
FIG. 1A shows a conventional method of combining an overlay image with a background video image to produce a blended image.
Figure 1B:
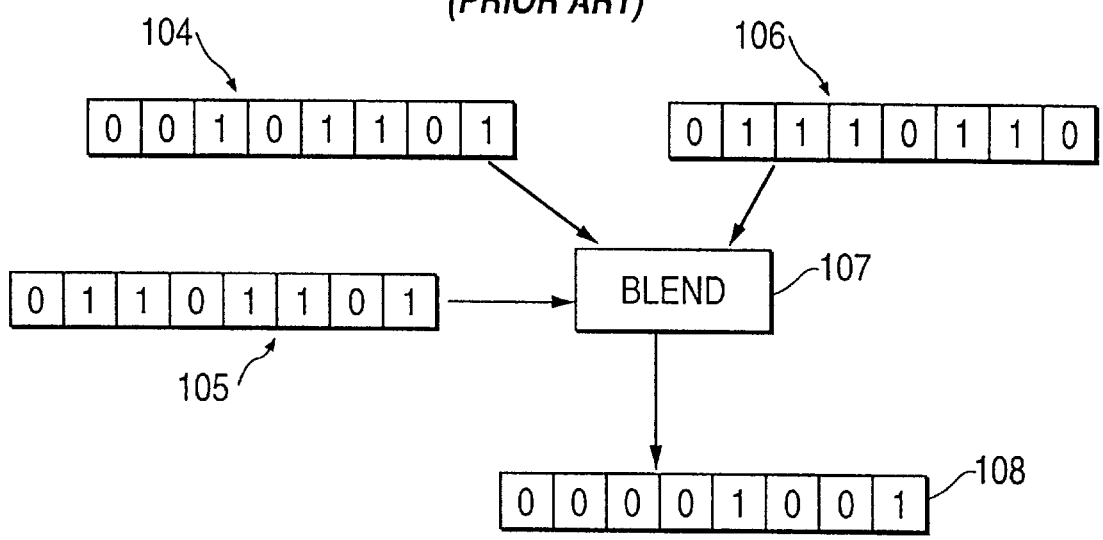
FIG. 1B shows a conventional technique for blending pixels using a blending value 105 associated with each pixel in an overlay image.
Figure 2:
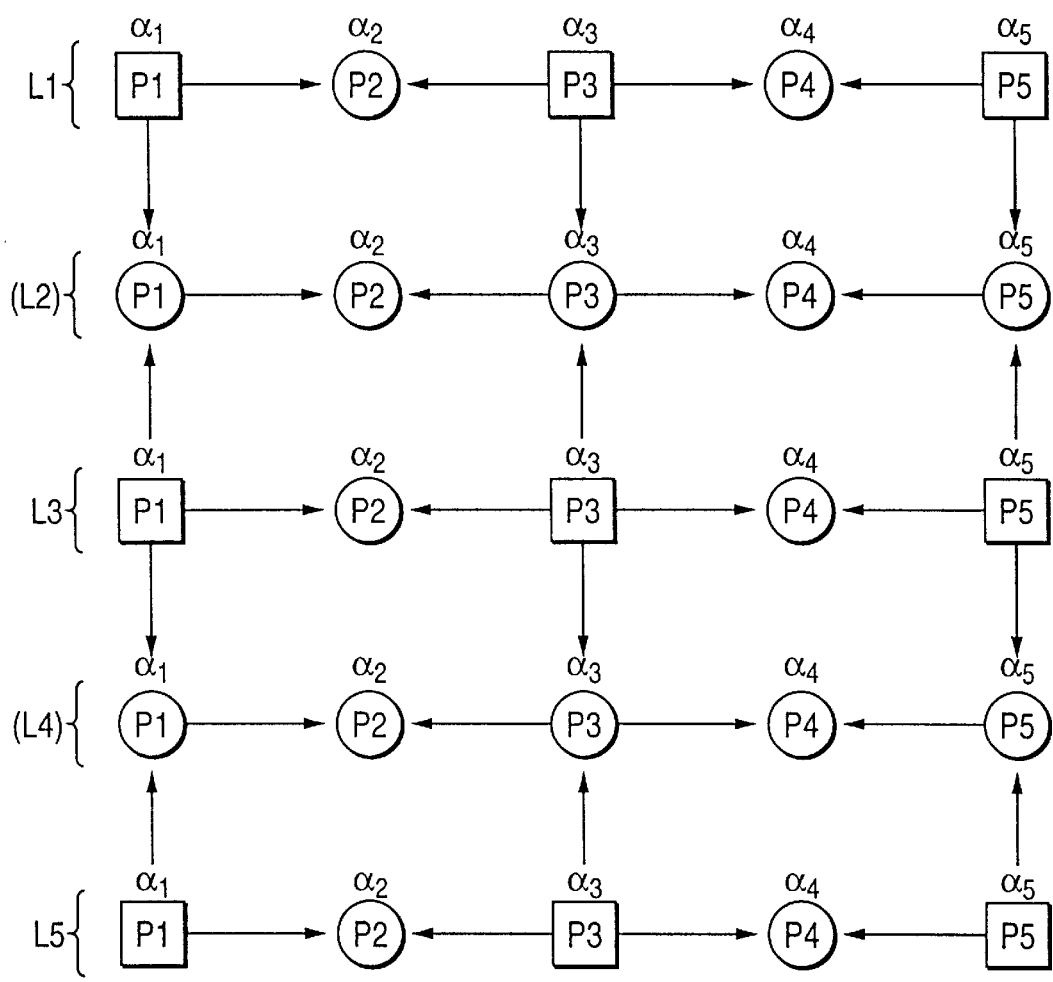
FIG. 2 shows how pixels from a medium or low resolution image can be interpolated to produce new pixels in a higher resolution image.

FIG. 2 shows how pixels from a medium or low resolution image can be interpolated to produce new pixels in a higher resolution image. Assuming an image comprises 320 (horizontal elements) by 240 (vertical lines) pixels, consider a nine element portion of such an image (e.g., three lines by three elements). As shown in FIG. 2, a first line L1 comprises pixels P1, P3, and P5, enclosed in squares to indicate that each such pixel is from the original input image. The reason that odd numbering is used to identify these pixels will become apparent shortly.

Interspersed between original pixels P1, P3 and P5 on line L1 are pixels P2 and P4, which are obtained by averaging pixels P1/P3 and P3/P5 respectively. Each interpolated pixel is shown within a circle to distinguish it from original pixels in the input image. By inserting interpolated pixel values between each pixel in line L1, the horizontal resolution of the line is doubled, e.g., from 320 to 640 pixels.

Line L3 of the original image similarly comprises pixels P1, P3 and P5 enclosed within squares, and original line L5 similarly comprises pixels P1, P3 and P5 enclosed within squares. Each pixel may take on a different value, as is conventional.

Interspersed between original lines L1 and L3 is new line L2, bracketed in parentheses to indicate that it is a new line introduced by interpolating corresponding pixels from lines L1 and L3. Similarly, new line L4 is created by interpolating corresponding pixels from lines L3 and L5. Each pixel in line L2 and line L4 is enclosed within a circle to indicate that the pixel value was determined by averaging values of two surrounding pixels. Note that some pixels, such as pixels P2 and P4 in line L2, are produced by averaging interpolated pixels (P1/P3 and P3/P5, respectively).

Also associated with each pixel is an alpha value α indicating the degree of blending to be performed between that pixel and a corresponding pixel from another image (e.g., a background video image). Each alpha value may comprise 8 bits, or may instead comprise a small number of bits to be used in conjunction with a table of alpha values, as described in more detail herein and in copending application Ser. No. 08/612,162, entitled "Blending of Video Images in a Home Communications Terminal".

Each pixel shown in FIG. 2 will be identified by line number and pixel number. For example, the notation L1P1 refers to the first pixel in line L1 of the original image, and the notation L5P3 refers to the second pixel in the third line of the original image (i.e., ignoring interpolated pixels). As another example, the notation L1P4 refers to the fourth pixel in the first line of the interpolated (output) image, and L4P3 refers to the third pixel in the first line of the interpolated (output) image.

Similarly, each alpha value in FIG. 2 will be identified by line number and an alpha value number corresponding to pixel number. Thus, the first alpha value in line L1, associated with pixel P1, will be referred to as L1α1.

The value of each interpolated pixel in FIG. 2 can be determined as follows:

L1P2=AVG (L1P1, L1α1, L1P3, L1α3)

L1P4=AVG (L1P3, L1α3, L1P5, L1α5)

L2P1=AVG (L1P1, L1α1, L3P1, L3α1)

L2P2=AVG (L2P1, L2P3), and so forth.

Note that all resulting interpolated pixel values have been pre-multiplied by the respective alpha values. E.g. L1P2 exists in pre-multiplied form. The resulting image thus consists of a medium resolution image which has been "filled in" with intermediate pixel values determined by averaging the surrounding pixel values which have been multiplied by their respective alpha values. Other approaches are possible, such as averaging L1P2 and L3P2 to produce L2P2.

When displaying colors in a format such as RGB16 format, each pixel value comprises three separate color component values, conventionally mapped as follows:

5 bits=red value 6 bits=green value 5 bits=blue value

Additionally, when alpha bits are associated with each pixel's color values to indicate the degree of blending when combining images, additional bits such as 8 bits per pixel can be stored with each of the above color component values, resulting in a total of 24 bits per pixel. Alternatively, as described in copending application Ser. No. 08/612,162, entitled "Blending of Video Images in a Home Communication Terminal", one or more alpha control bits can be used for each pixel and alpha values from a table can be applied to pixels which are to be blended.

In accordance with the various aspects of the present invention, each of the color components and the alpha values are interpolated for each pixel to produce the output image.

The averaging is performed between pixels which are first multiplied by their respective alpha values. Thus, for example, to compute the value of L1P2 in a higher resolution output image, an averaging operation is performed on the 5 bits of red value between pixels L1P1 and L1P3 (note that each color component is premultiplied by its respective alpha value prior to being averaged). Similarly, a separate averaging operation is performed on the 6 bits of green value, 5 bits of blue value, and 8 bits of alpha value to produce the interpolated pixel L1P2.

Figure 3A:
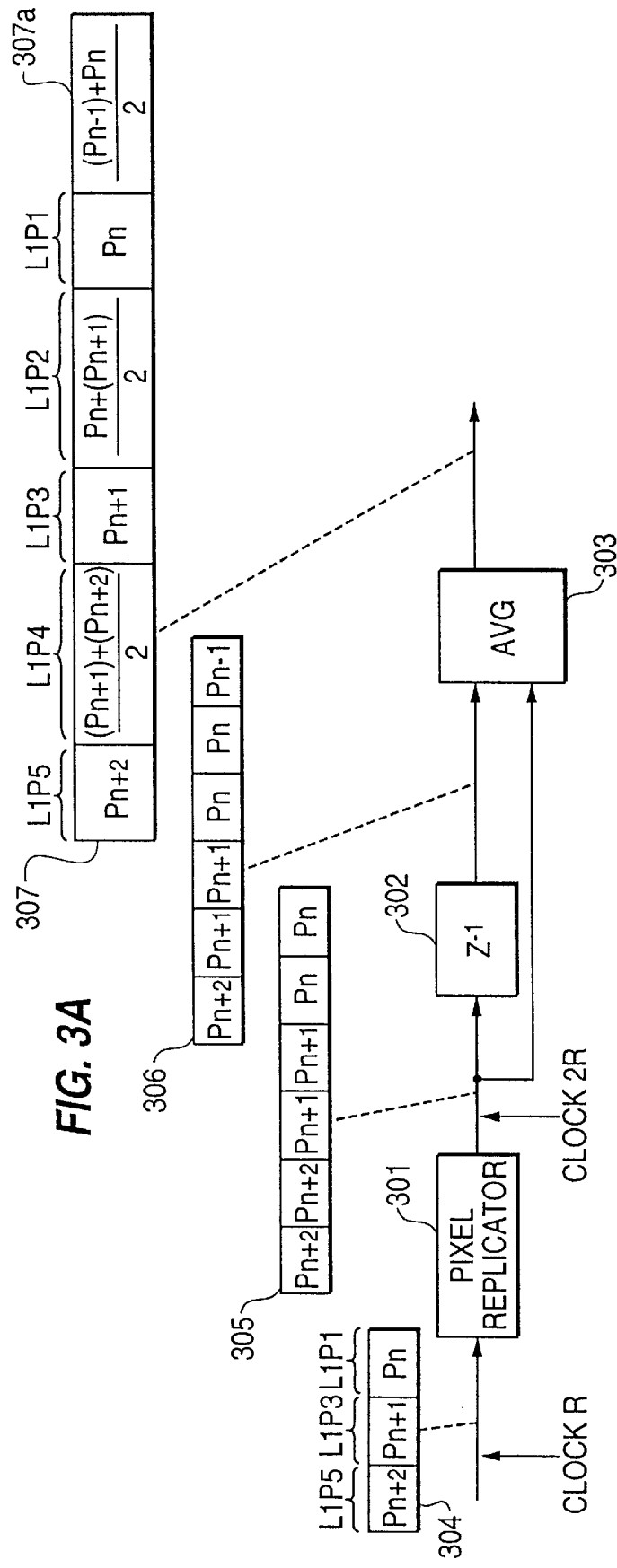
FIG. 3A shows a horizontal pixel interpolation circuit which can be used to efficiently generate a line of horizontally interpolated pixels.

FIG. 3A shows a horizontal pixel interpolation circuit which can be used to efficiently generate a line of horizontally interpolated pixels using a minimum number of components. Thus, the circuit shown in FIG. 3A can be used to generate all the pixels in line L1 of FIG. 2 based on original pixels L1P1, L1P3, and L1P5.

In FIG. 3A, a first train of pixels 304 is generated at a clock rate R. The subscripts for each pixel in FIG. 3A identify the time period for which that pixel has been clocked. Thus, in pixel train 304, pixel $P_n$ is the first pixel read from a horizontal line of an input image (e.g., L1P1); $P_{n+1}$ is the next pixel (a clock cycle later, e.g., L1P3), and $P_{n+2}$ is a third pixel (two clock cycles later, e.g., L1P5). Pixel replicator 301 generates a second train of pixels 305 in which each element of first train 304 has been replicated. This can be done by "double clocking" the first pixel train at a clock rate 2R.

Second pixel train 305 is fed into a delay element 302, which creates a delayed pixel train 306, identical to pixel train 305 except that each pixel is delayed by one clock cycle (delayed with respect to the 2R clock rate). Thereafter, both pixel trains 305 and 306 are fed to averaging circuit 303, which averages corresponding pixels in pixel trains 305 and 306 to create averaged pixel train 307 which includes original pixels $P_n$, $P_{n+1}$ and $P_{n+2}$ with interpolated values inserted therebetween. Averaging circuit 303 may be constructed very efficiently by using an adder followed by a one-bit shifter, which accomplishes an averaging function.

Because of delay element 302, certain pixel values will be averaged with themselves—thus reproducing the original pixel values—while others will be averaged with their pixel neighbors. Thus, the circuit of FIG. 3A provides an extremely efficient technique for generating a line of horizontally interpolated pixels such as line L1 of FIG. 2. Assuming that pixels L1P1, L1P3, and L1P5 are clocked sequentially in train 304 as shown in FIG. 3A, pixel train 307 will thus contain the desired full line of L1 including interpolated pixels L1P2 and L1P4 (interpolated value 307a can be discarded). Thus, it can be seen that the original line L1 of the input image comprising pixels L1P1, L1P3, and L1P5 has been "expanded" to include interpolated pixels.

Figure 3B:
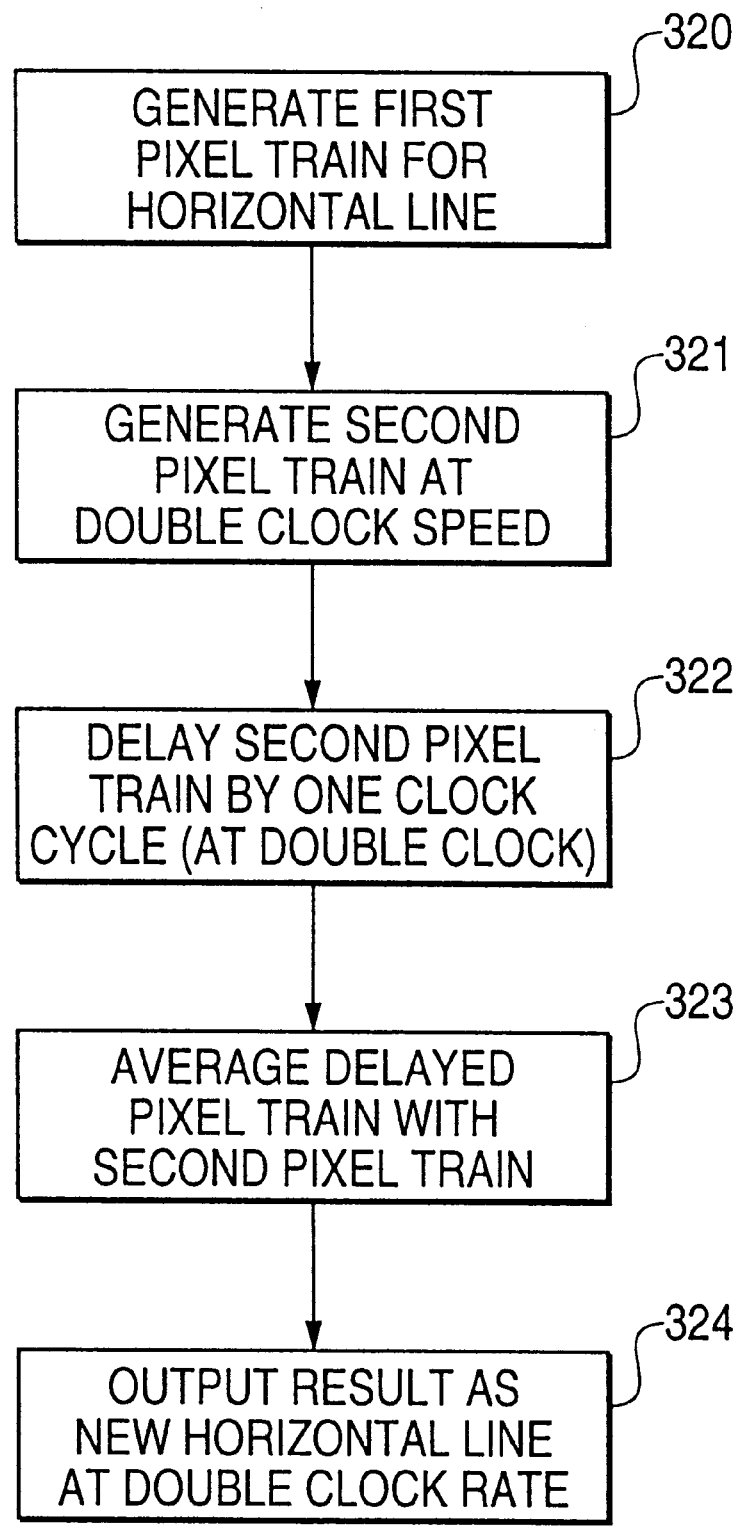
FIG. 3B shows various steps which can be performed to generate a line of horizontally interpolated pixels.

FIG. 3B shows a method for efficiently generating a line of horizontally interpolated pixels using a minimum number of components. Thus, the method shown in FIG. 3B can be used to generate line L1 of FIG. 2. In step 320, a first pixel train is generated corresponding to a horizontal line in the input image. In step 321, a second pixel train is generated by replicating pixels in the first pixel train, preferably by double clocking the first pixel train. Thereafter, in step 322 the second pixel train is delayed by one clock cycle (i.e., delayed with respect to the double clock). In step 323, the delayed pixel train and the second pixel train are averaged, and in step 324 the resulting pixel train is output as the new (interpolated) horizontal line of the input image.

Figure 4:
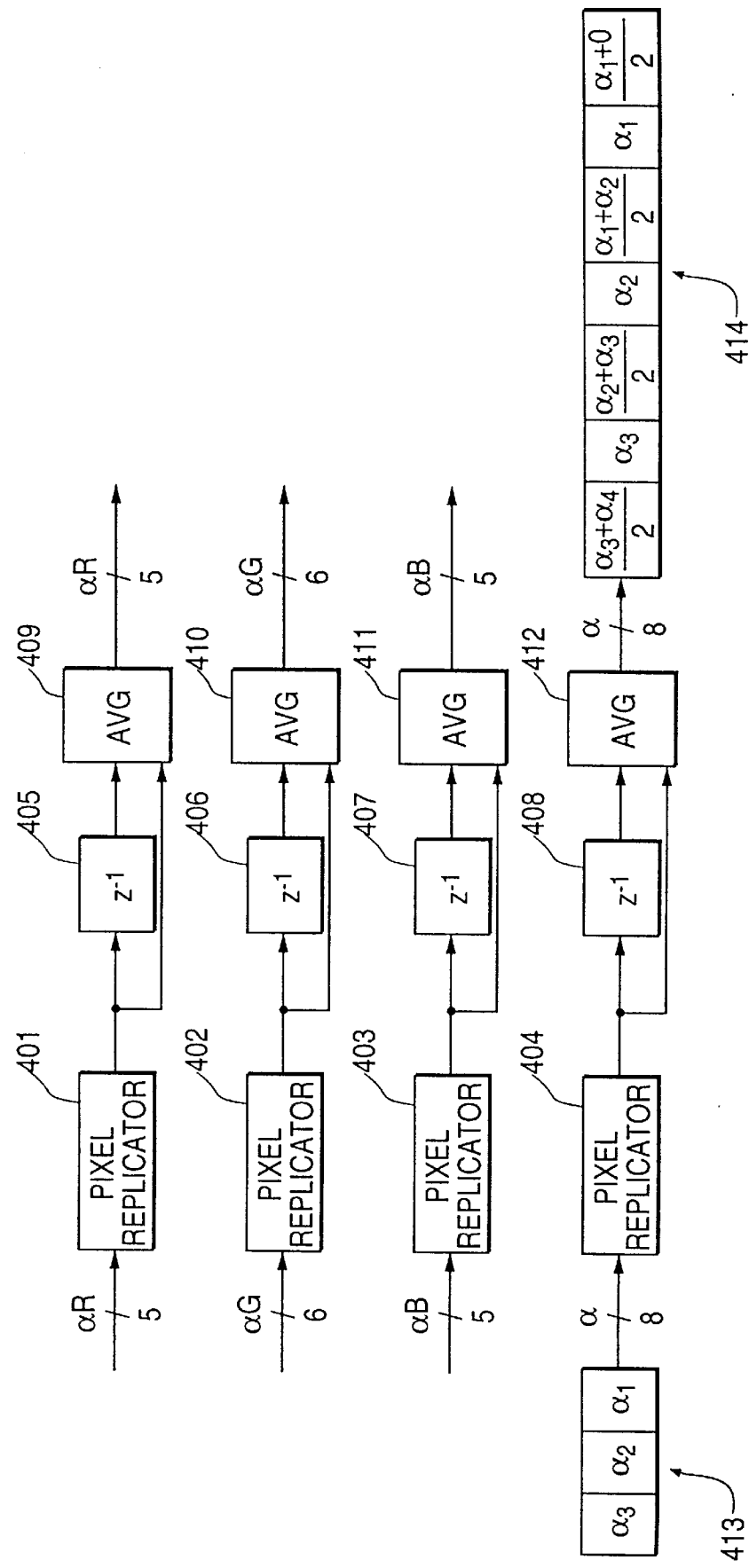
FIG. 4 shows a horizontal pixel interpolation circuit which separately interpolates red, green, and blue color components for each pixel, as well as an alpha value for each pixel.

Referring now to FIG. 4, in accordance with various embodiments of the invention, alpha blending values may also be interpolated using the above described techniques. Thus, for example, an input pixel train 413 comprising alpha blending values associated with each pixel in an input image is processed through pixel replicator 404, delay circuit 408, and averaging circuit 412 to produce an interpolated alpha blending value train 414 comprising the original alpha blending values interspersed with averaged values.

Figure 6:
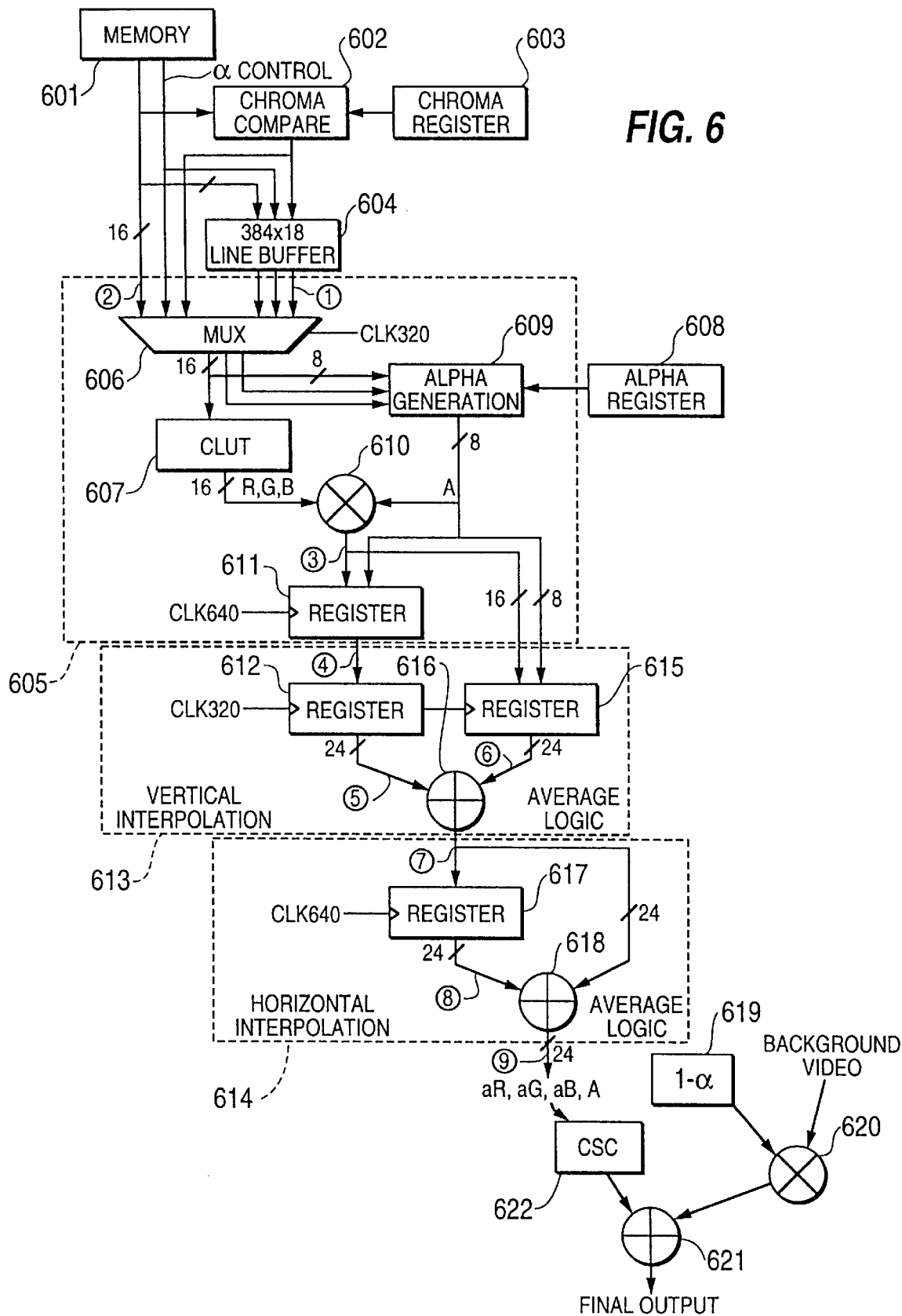
FIG. 6 shows a circuit which can be used to implement vertical and horizontal interpolation in combination with alpha blending.

Moreover, as described above, when operating in a color mode such as RGB16 and using alpha values, each color component and alpha value is interpolated separately. Accordingly, as shown in FIG. 4, pixel replicators 401 through 403 replicate pixel trains corresponding to red, green, and blue color components for each pixel (each color component being premultiplied by its respective alpha value). Similarly, delay elements 405 through 407 and averaging circuits 409 through 411 perform delay and averaging operations to produce corresponding output trains which may be stored into corresponding pixel component locations in memory associated with each pixel. Alternatively, these operations may be performed with a single circuit which is time-multiplexed according to well known methods. FIG. 6 shows one possible circuit for performing the functions of FIG. 4.

Figure 5:
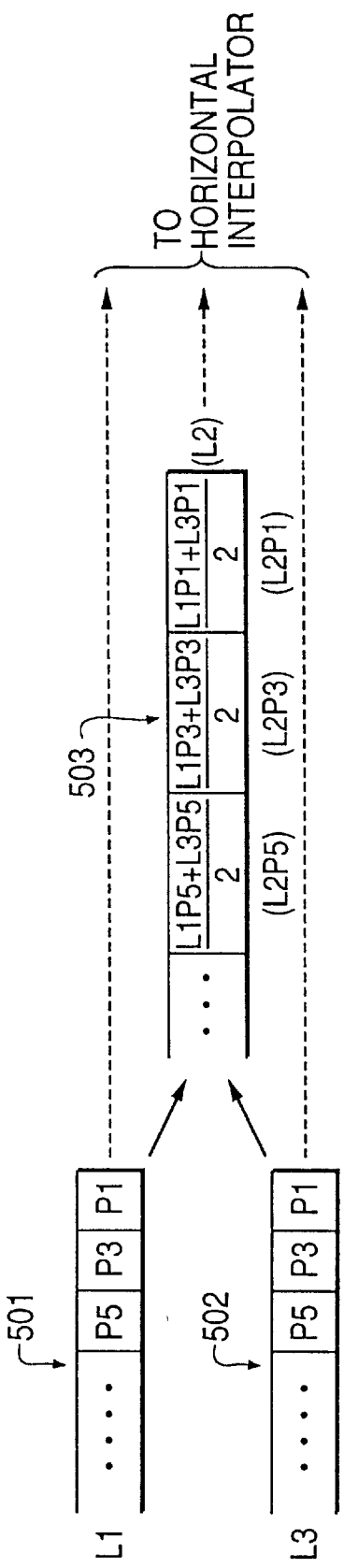
FIG. 5 shows how two lines of an input image can be vertically averaged to generate an interpolated line which is fed to a horizontal interpolator.

Reference will now be made to FIG. 5. In various embodiments, it may be preferable to interpolate display lines vertically first, then to feed pixels from each such line to the horizontal interpolation circuit of FIG. 3A. Thus, for example, referring again to FIG. 2, pixels from lines L1 and L3 can be averaged to create L2 (the line of circles), and then pixels from lines L1, L2, and L3 can be "expanded" horizontally using the horizontal interpolation technique shown in FIGS. 3A and 3B. With reference to FIG. 5, a first pixel train 501 corresponding to line L1 is averaged with a second pixel train 502 corresponding to line L3 to create a pixel train 503 corresponding to line L2, and then all three lines are horizontally interpolated using the technique of FIG. 3A and FIG. 3B.

FIG. 6 shows one possible circuit configuration for implementing various features of the present invention. In particular, the circuit of FIG. 6 can be used to implement both vertical and horizontal pixel interpolation, as well as a partial blending of overlay pixels with alpha values.

In various embodiments, the circuit of FIG. 6 can be programmed to operate in either RGB or CLUT (color look-up table) modes, so that substantially the same circuitry can be used for both pixel types. The design shown in FIG. 6 can be implemented using an application-specific integrated circuit (ASIC) to enhance performance and minimize the number of parts. Additionally, although it is contemplated that a single alpha control bit may be used for each overlay pixel, a plurality of alpha blending bits can of course be used, at the expense of added memory. Various other means of generating an alpha blending value for each pixel in an overlay image are described herein and in copending application Ser. No. 08/612,162 entitled "Blending of Video Images in a Home Communication Terminal".

Overlay pixels may be stored in any of various formats in memory (although it is of course desirable to use a common format for a single image). For example, the following three pixel formats may be used:

(1) RGB16: each pixel value comprises 16 bits, coded as 5 bits for red, 6 bits for green, and 5 bits for blue. Additional bits (1, 2, or more) may be added for establishing an alpha blending value.

(2) CLUT8: each pixel value comprises 8 bits, and serves as an index into a color look-up table, whose entries consist of RGB values. Note that interpolation in CLUT8 mode is performed in the RGB domain, after performing the color look-up operation. Additional bits (1, 2, or more) may be added for establishing an alpha value.

(3) ACLUT8: each pixel value comprises 8 bits, and also includes 8 bits of alpha blending value. When this mode is used, the alpha control bit(s) are disabled. The transparency, translucency or opacity of each overlay pixel is determined solely by the alpha blending value encoded for each pixel. Any of various other formats are of course possible, and it is contemplated that the circuit of FIG. 6 could be used to operate in various modes depending on the pixel format and alpha blending value format.

As shown in FIG. 6, a memory 601 such as a DRAM may be used to store an overlay image. When in RGB16 mode, for example, each pixel may comprise 16 bits split into the three color components, whereas in CLUT8 mode, for example, each pixel value comprises 8 bits which are mapped to RGB values using a color look-up table CLUT 607 (in RGB modes, the CLUT is bypassed). A chroma keying value can be established which, when a match occurs with an overlay pixel value, causes the overlay pixel to be completely transparent. This can be accomplished by forcing the alpha blending value to be zero.

Assuming that RGB16 mode is enabled and that a chroma key value has been defined in chroma register 603, 16 bits of overlay pixel value are fed to MUX 606, line buffer 604 and chroma compare circuit 602. Chroma compare circuit 602 compares the overlay pixel value with a value (or range) stored in chroma register 603. If the overlay pixel value is transparent (i.e., the chroma comparison is favorable), then blending of the overlay and background video are disabled, and only the background video pixel is displayed (i.e., the overlay pixel is ignored).

If the chroma comparison is unfavorable (i.e., the overlay pixel is not transparent), then the alpha control bit is fed through MUX 606 to alpha generation and multiply circuit 609, along with the alpha blending value read from alpha register 608. Alpha generation and multiply circuit 609 checks to see whether the alpha control bit for the overlay pixel is set. If the alpha control bit is set, then the overlay pixel is pre-multiplied with the alpha value, causing blending to occur. If the alpha control bit is not set, then the effective alpha values is "1" and only the overlay pixel is displayed (i.e., the overlay pixel is "opaque" and the background pixel is ignored).

When operating in ACLUT8 mode (i.e., 8 bits per pixel), 8 additional bits can be allocated as an alpha blending value for each pixel. Thus, instead of a single alpha control bit, 8 bits of an alpha blending value can be used, and the transparency value (opaque, transparent, or translucent) can be determined solely by the alpha value encoded for each pixel. Accordingly, any alpha blending value in alpha register 608 is ignored, and the 8 bits of each overlay pixel are blended using that pixel's 8 bits of alpha blending value after looking up the pixels RGB value from a color look-up table.

In conjunction with the blending operation, pixels may be interpolated vertically and horizontally in circuits 613 and 614, respectively. Additionally, when associating alpha blending bits with each pixel, the alpha values of two interpolated pixels are themselves interpolated.

Blending may occur in stages, one of which is before interpolation and one of which is after interpolation; i.e., the original pixel is pre-multiplied by alpha before interpolation, then the pixels and the alpha value are interpolated, and then the result is blended with the background video by multiplying the background by (1−α) and adding the result to the interpolated foreground. As shown in FIG. 6, background video pixels are fed to a multiplier 620 which multiplies each background pixel by (1−α). The result is fed to an adder 621, which causes the background pixel to be added to the overlay pixel. Blending could instead be performed after interpolation, or it could be performed in various other ways which will be readily apparent to those of ordinary skill in the art.

As described in the copending application Ser. No. 08/612,162, entitled "Blending of Video Images in a Home Communication Terminal", an alpha value may be generated for each overlay pixel in any of various ways, such as: (1) associating a distinct multi-bit alpha value with each pixel in the overlay image (e.g., 8 extra bits); (2) associating one or more alpha control bits with each pixel in the overlay image and using these bits to look up a larger alpha value from a table or register; (3) using one or more alpha control bits in combination with a chroma key which, by comparing the pixel value with a chroma value, determines whether that overlay pixel will be transparent; and (4) using a chroma key with no alpha control bits. Combinations of these approaches are of course also possible.

In any of these methods, it is assumed that an alpha value for each pixel in the overlay image can be supplied in order to perform the blending operation.

Rather than storing, e.g., 8 bits of alpha value with each pixel, for example a two-bit value can be stored with each pixel value to save memory space, wherein each possible combination of the two bits corresponds to a predetermined ratio to be multiplied by a predetermined alpha value. Thus, for example, a binary value of 00 could correspond to zero blending (i.e., 0α); 01 could correspond to 0.25α (or any other predetermined ratio); 10 could correspond to 0.75α (or any other predetermined ratio); and 11 could correspond to blending with 1.0α, where α is a predetermined alpha value. Other variations are of course possible. Alternatively, one, two or more alpha control bits may be encoded to refer to different alpha values entirely, where each alpha value preferably comprises more bits than the bits used to encode them. Thus, for example, a value of 00 may refer to a first alpha blending value; a value of 01 would refer to a second alpha blending value; and so forth. In this manner, a small number of alpha control bits can be used to "look up" a much larger alpha blending value or values, resulting in significant memory space savings.

It will be appreciated that the circuit shown in FIG. 6, which may be implemented with an application-specific integrated circuit (ASIC), is only one possible approach for practicing the principles of the invention. Furthermore, other variations on the circuit shown in FIG. 6 are possible. For example, chroma compare circuit 602 can be positioned below MUX 606, such that pixel values are compared after being stored in line buffer 604.

Any of various display resolutions may be implemented. Two common medium resolution formats are 320×240, and 384×288. Accordingly, it may be desirable to use a line buffer which is 384 pixels long to accommodate the larger format.

When using RBG16 format, each pixel may comprise 16 bits of color value and one bit for alpha control. All 16 bits of color, as well as the alpha control bit total and chroma keying bit from chroma compare circuit 602 (total of 18 bits) are read into line buffer 604, which may hold 384 pixels by 18 bits per pixel (384 may be used to support 384×288 resolution, which is slightly denser than 320×240). The 16 bits of color and the alpha control bit are also fed to MUX 606. The 16 bits of color are compared in chroma comparator 602 to generate a one-bit chroma keying value.

A first line is stored into line buffer 604, then the next line is fed to MUX 606. To avoid the need to have two multiplications and two CLUT tables, MUX 606 can be used to process lines alternately.

The following sections describe how the circuit of FIG. 6 can be operated differently depending on the specific type of display format.

1. High-Resolution Mode (No interpolation)

The circuit of FIG. 6 can be used to blend overlay pixels with alpha values without interpolation (e.g., when using an overlay image which has the same display resolution as a background image). The following describes how the circuit of FIG. 6 can be operated to perform blending without interpolation, for each of various pixel formats.

A. RGB Pixel Format

An RGB pixel value and a 1-bit alpha control bit are transferred from memory 601. A chroma compare operation is performed using maximum and minimum values from chroma register 603. If the overlay pixel value falls within this range, it is denoted transparent, and a 1-bit chroma compare flag is set to indicate this. If the chroma compare flag is set, the alpha control bit is ignored, and the alpha blending value is defined to be zero (i.e., the overlay pixel will be multiplied by zero and thus be transparent).

If the chroma compare flag is not set, then the 1-bit alpha control bit is examined. If this bit is "1", the alpha value is defined to be the value in alpha register 608 (i.e., the predetermined alpha value), and the overlay pixel is translucent (i.e., it will be blended). If the alpha control bit is "0", the pixel is considered opaque, and the alpha value is "1" (i.e., the overlay pixel will obscure the background pixel). Interpolation is bypassed due to being in high resolution mode, and the overlay pixel data is passed through to a color space converter 622. The pixel values are blended with the background pixel values in adder 621. This blending could occur in the same (RGB) color space or in another (e.g., YCbCr) color space. In the latter case, the pixel values are converted by color space converter 622 before being blended with the background pixels.

B. CLUT8 Pixel Format

An 8-bit pixel value and 1-bit alpha control bit are read from memory 601. A chroma compare operation is performed using the chroma value from chroma register 603. If the pixel value matches this index, it is deemed to be transparent, and a 1-bit flag is set to indicate this. If the chroma compare flag is set, the alpha control bit is ignored and the alpha value is zero (i.e., the overlay pixel will be multiplied by zero and thus be transparent).

If the chroma compare flag is not set, then the 1-bit alpha control bit is examined. If this bit is "1", the alpha value is defined to be the value in alpha register 608, and the overlay pixel is translucent. If the alpha control bit is "0", the pixel is considered opaque, and the alpha value is "1" (i.e., the overlay pixel will obscure the background pixel). The CLUT portion of the data passes through a color look-up table 607 to obtain RGB values. Interpolation is bypassed due to being in high resolution mode, and the RGB data is multiplied with alpha, passed through the color space converter 622 and thereafter blended with the background (video) data.

C. ACLUT8 Pixel Format

An 8-bit pixel value and 8 bit alpha value are read from memory 601. A chroma compare operation is performed using the chroma value from chroma register 603. If the overlay pixel value matches this value, it is deemed to be transparent, and a 1-bit flag is set to indicate this. If the chroma compare flag is set, the alpha value is defined to be "0" (i.e., the overlay pixel will be multiplied by zero and thus transparent).

If the chroma compare flag is not set, then the 8-bit alpha value from line buffer 604 is used as the alpha value. The data passes through a color look-up table 607 to obtain RGB values. Interpolation is bypassed due to being in high resolution mode, and the RGB data is multiplied with alpha, passed through the color space converter 622, and thereafter blended with the background (video) data.

2. Medium-Resolution Mode (Top Field)

For interlaced displays, each horizontal line of an image is either on an odd field or an even field of the display, also referred to as "top" and "bottom", respectively. For medium resolution mode, the top field of data behaves similarly to the high resolution mode except that horizontal interpolation may be utilized.

A. RBG Data Format

An RGB pixel value and a 1-bit alpha control bit are read from memory 601. A chroma compare operation is performed using maximum and minimum values from chroma register 603. If the pixel value falls within this range, it is deemed to be transparent, and a 1-bit flag is set to indicate this. If the chroma compare flag is set, the alpha control bit is ignored and the alpha value is defined to be zero (i.e., the overlay pixel will be multiplied by zero and thus transparent).

If the chroma compare flag is not set, then the 1-bit alpha control bit is examined. If this alpha control bit is "1", the alpha value is defined to be the value in the alpha register, and the overlay pixel is translucent. If the alpha control bit is "0", the pixel is considered to be opaque, and the alpha value is "1" (i.e., the overlay pixel will obscure the background pixel).

If horizontal interpolation is enabled, horizontal interpolation will be performed by horizontal interpolation section 614. The line buffer is bypassed because vertical interpolation is not needed in the top field. The value in the alpha register 608 is used to multiply with the data (i.e., each component of the RGB value of each pixel is multiplied by the appropriate alpha value), then both the alpha value and pixel data are interpolated. The alpha value is zero in the case that the chroma compare flag is set; it is one in the case that the chroma compare flag is not set and the alpha control bit is also zero; and it is the value in the alpha register 608 in the case that the chroma compare flag is not set and the alpha control bit is one. The vertical interpolation module is bypassed since this is the top field (odd line) of data. Arriving at the horizontal interpolation module, one weighted copy of the blended data goes to the averaging logic in horizontal interpolation section 614. The two are averaged, yielding a full line of data. Both the RGB color and the alpha values are interpolated.

Before horizontal interpolation, each overlay pixel has 3 possible alpha values: 0, $\alpha$, and 1. If only horizontal interpolation is enabled, the interpolated alpha value is the average of two values, each of which can be 0, $\alpha$, and 1. In the case of the NTSC square pixel format, horizontal interpolation corresponds to taking 320 pixels and interpolating to obtain 640 pixels per line.

B. CLUT8 Data Format

An 8-bit pixel value and 1-bit alpha control bit are read from memory 601. A chroma compare operation is performed using the chroma key value from chroma register 603. If the pixel value matches this value, it is deemed to be transparent, and a 1-bit flag is set to indicate this. If the chroma compare flag is set, the alpha value is defined to be zero (i.e., the overlay pixel will be multiplied by zero and thus transparent).

If the chroma compare flag is not set, then the 1-bit alpha control bit is examined. If this bit is "1", the alpha value is defined to be the value in the alpha register, and the overlay pixel is translucent. If the alpha control bit is "0", the overlay pixel is considered opaque, and the alpha value is "1" (i.e., the overlay pixel will be multiplied by one and thus obscure the background image).

The overlay pixel data is then passed through color lookup table 607 to convert it to RGB. The value in alpha register 608 is used to multiply with the data before interpolation. The vertical interpolation section 613 is bypassed because this is the top field. Arriving at the horizontal interpolation section 614, one copy of the alpha-multiplied data goes to horizontal interpolation register 617 and another weighted copy goes to the averaging logic in horizontal interpolation section 614. The two are averaged, yielding a full line of data. Both the RGB color and the alpha values are interpolated.

Before horizontal interpolation, each overlay pixel has 3 possible alpha values: 0, α, and 1. In the case of the NTSC square pixel format, horizontal interpolation corresponds to taking 320 pixels and interpolating to obtain 640 pixels per line.

C. ACLUT8 Data Format

An 8-bit pixel value and an 8-bit alpha value are read from memory 601. A chroma compare operation is performed using the chroma value from chroma register 603. If the pixel value matches this index, the overlay pixel is deemed to be transparent and a 1-bit flag is set to indicate this. If the chroma compare flag is set, the alpha control bit is ignored, and the alpha value is defined to be "0" (i.e., the overlay pixel will be multiplied by zero and thus transparent). If the chroma compare flag is "0", then the 8-bit alpha value from line buffer is used as the alpha value.

The overlay pixel data is then passed through color lookup table 607 to convert it to RGB. The 8-bit alpha value from the line buffer is used to premultiply the pixel value before interpolation. The vertical interpolation section is bypassed because this is the top field. Arriving at the horizonal interpolation section, one weighted copy of the blended data goes to horizontal interpolation register 617 while another weighted copy goes to the averaging logic in horizontal interpolation section 614. The two are averaged, yielding a full line of data. In the case of the NTSC square pixel format, this corresponds to taking 320 pixels and interpolating to obtain 640 pixels per line.

3. Medium Resolution (Bottom Field)

For medium resolution mode, the bottom field of data (even lines) behaves differently. If interpolation is not enabled, then the data will be identical to the top field and (in the case of NTSC square pixel format) will be only 320 pixels/line. A "flutter" will be visible since the top and bottom fields will have the same data. Vertical interpolation will alleviate the visible flutter. Performing vertical interpolation before horizontal interpolation yields fewer calculations than the reverse interpolation order. After interpolation is completed, the data is sent to a color space converter 622, and then on to a display controller.

A. RGB Data Format

An RGB pixel value and 1-bit alpha control bit are read from memory 601. A chroma compare operation is performed using maximum and minimum values from chroma register 603. If the overlay pixel value falls within this range, it is deemed to be transparent, and a 1-bit flag is set to indicate this. If the chroma compare flag is set, the alpha value is defined to be zero (i.e., the overlay pixel will be multiplied by zero and thus transparent).

If the chroma compare flag is not set, then the 1-bit alpha control bit is examined. If this bit is "1", the alpha value is defined to be the value in the alpha register, and the overlay pixel is translucent. If the alpha control bit is "0", the overlay pixel is considered opaque, and the alpha value is "1" (i.e., the overlay pixel will obscure the background pixel). When interpolation is enabled, the data from memory 601 and chroma compare 602 enters line buffer 604. The encoded 2 bits (alpha control bit and chroma key bit) are appended to the RGB 16 color data.

Initially, LINE 1 (the first line of overlay pixel data) enters the line buffer 604. Thereafter, LINE 3 (the second line of overlay pixel data) is read and entered into the line buffer as well as becoming a real time input to an adder. The first line leaves the line buffer and becomes the second input to the adder. The vertical interpolation section 613 performs vertical interpolation (i.e. averaging color and alpha values). Horizontal interpolation is then performed in horizontal interpolation section 614.

B. CLUT8 Data Format

An 8-bit pixel value and a 1-bit alpha control bit are read from memory 601. A chroma compare operation is performed using the chroma value from chroma register 603. If the pixel value matches this value, it is deemed to be transparent, and a 1-bit flag is set to indicate this. If the chroma compare flag is set, the alpha value is defined to be "0" (i.e., the overlay pixel will be multiplied by zero and thus transparent).

If the chroma compare flag is not set, then the 1-bit alpha control bit is examined. If this alpha control bit is "1", the alpha value is defined to be the value in the alpha register, and the overlay pixel is translucent. If the alpha control bit is "0", the pixel is considered opaque, and the alpha value is "1" (i.e., the overlay pixel will obscure the background pixel).

When vertical interpolation is enabled, the pixel data from memory 601 and the chroma comparator 602 enters line buffer 604. The two bits of alpha control and chroma keying are appended to the CLUT8 color data. Initially, LINE 1 (the first line of overlay pixels) enters the line buffer. Thereafter, LINE 3 (the second line of overlay pixels) is read and entered into the line buffer as well as becoming a real time input to an adder. The first line leaves the line buffer and becomes the second input to the adder.

Before being added, the two signals are converted to RGB16 via color lookup table 607. Because there is only one color lookup table in various embodiments, a multiplexer is used to allow the addends to access the table one at a time for conversion. This multiplexing can be performed in real time because in medium resolution mode, every pixel occupies 2 pixel clocks. Vertical interpolation section 613 performs vertical interpolation (i.e. averaging color and alpha values). Horizontal interpolation is then performed in section 614.

C. ACLUT8 Data Format

An 8-bit pixel value and 8-bit alpha value are transferred from memory 601. A chroma compare operation is performed using the chroma value from chroma register 603. If the overlay pixel value matches this value, it is deemed to be transparent and a 1-bit flag is set to indicate this. If the chroma compare flag is set, the alpha value is defined to be zero.

If the chroma compare flag is not set, then the 8-bit alpha value from memory 601 is used as the alpha value. When vertical interpolation is enabled, the data from memory 601 and chroma comparator 602 enters line buffer 604. Initially, LINE 1 (the first line of overlay pixels) enters line buffer 604. Thereafter, LINE 3 (the second line of overlay pixels) is read and entered into line buffer 603 as well as becoming a real time input to an adder. LINE 1 (the first line of overlay pixels) leaves the line buffer and becomes the second input to the adder.

Before being averaged, the two signals are converted to RGB16 via color lookup table 607. Because there is only one color lookup table in various embodiments, a multiplexer is used to allow the addends to access the table one at a time for conversion. This multiplexing can be performed in real time because in medium resolution mode, every pixel occupies 2 pixel clocks. Vertical interpolation section 613 performs vertical interpolation (i.e. averaging color and alpha values). Horizontal interpolation is then performed in section 614.

Figure 7:
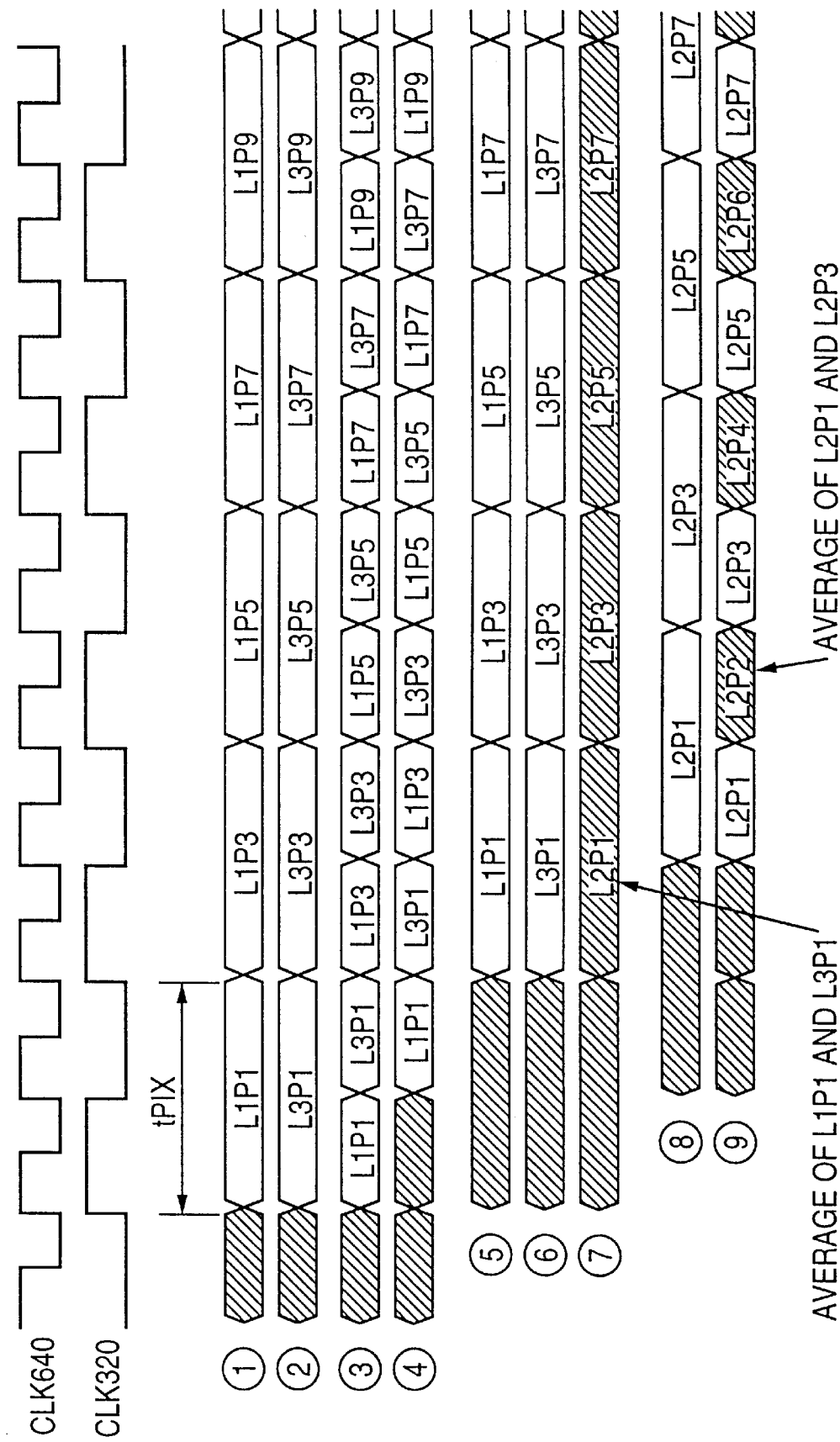
FIG. 7 shows a timing diagram corresponding to numbered circles in the circuit of FIG. 6.

FIG. 7 shows a timing diagram which corresponds to the circuit of FIG. 6. Each number contained within a circle in FIG. 7 identifies a corresponding circuit point in FIG. 6. As can be seen in FIG. 7, the output of line buffer 604 (circle 1) corresponds to the original pixels on line 1 of the input image at each CLK320 clock cycle (CLK320 operates at half the CLK640 rate, which is the "high resolution" pixel rate). Conversely, the output of memory 601 (circle 2) corresponds to the original pixels on line 3 of the input image at each CLK320 clock cycle. The output of multiplexer 606 (circle 3, after multiplier 610) alternates pixels from each line at each clock cycle CLK640, and the output of register 611 (circle 4) repeats this pattern but delayed by one CLK640 clock cycle.

The output of register 612 (circle 5) again regenerates the pixels from line 1 of the input image, but offset by a full CLK320 clock cycle, while the output of register 615 (circle 6) regenerates the pixels from line 3 of the input image, but offset by a full CLK320 clock cycle. After average logic 616 (circle 7), averages of corresponding pixels from line 1 and line 3 of the input image are created (e.g., creating line 2 through vertical pixel averaging). Following average logic 618 (circle 9), averages of individual pixels on the same line are generated, at twice the clock rate of the pixels from the vertically averaged lines. L1P1 and L1P4 are needed only for the top field, and are generated by horizontal interpolation. FIG. 7 shows a bottom field waveform, where both vertical and horizontal filtering and needed. Thus, L2P2= AVG (L2P1, L2P3), and L2P4=AVG (L2P3, L2P5).

Figure 8:
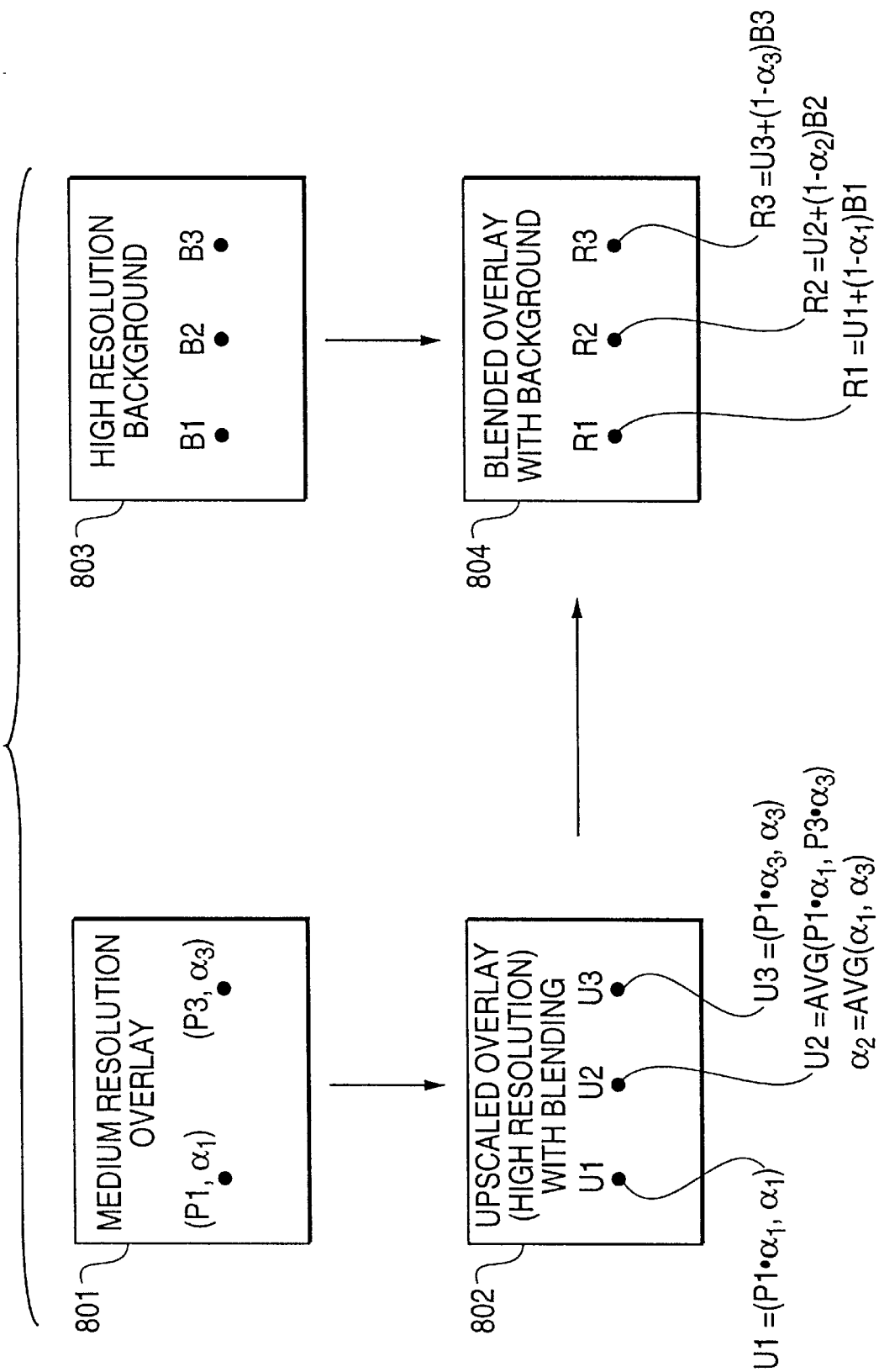
FIG. 8 shows how a medium resolution overlay image 801 can be upscaled and blended with a high resolution background image 803 to form a blended overlay with background image 804.

FIG. 8 shows diagrammatically how a medium resolution overlay image 801 can be upscaled and blended with a high resolution background image 803 to produce a resulting image 804. Thus, FIG. 8 shows how the circuit of FIG. 6 can combine the blending and upscaling operations.

In FIG. 8, medium resolution overlay image 801 is assumed to comprise 320×240 overlay pixels. Looking at two horizontally adjacent pixels P1 and P3 each having a corresponding alpha value $\alpha 1$ and $\alpha 3$, each pixel is premultiplied with its alpha value (using any alpha generation technique previously discussed) and the corresponding alpha values are averaged to create interspersed pixel U2 with alpha value $\alpha 2$ in image 802. Additionally, each overlay pixel value may be multiplied by its corresponding alpha value in the circuit of FIG. 6 using alpha generation circuit 609 (e.g., U1 and U3), in preparation for blending with a high resolution background image 803, which is already assumed to have pixels B1, B2 and B3 (e.g., 640×480 format).

Thus, pixel P1 from medium resolution overlay 801 is multiplied by its alpha value $\alpha 1$ to create an intermediate pixel U1 (its alpha value, however, does not change). Similarly, pixel P3 from medium resolution overlay 801 is multiplied by its alpha value $\alpha 3$ to create an intermediate pixel U3. In order to create intermediate "upscaled" pixel value U2 in image 802, the pixel values of each corresponding neighbor U1 and U3 are averaged (i.e., the average of P1 and P3 after being multiplied by their corresponding alpha values), and the alpha value of U2 is determined to be the average of the alpha values of U1 and U3. When this operation is performed over the entire overlay image 801, intermediate image 802 has the same resolution as background video image 803.

Thereafter, pixels from background image 803 are multiplied by one minus the alpha value of each corresponding pixel from intermediate image 802, and are added to each pixel from intermediate image 802. Thus, resulting pixel R1 in image 804 has the value $U1+(1-\alpha 1)B1$, while resulting pixel R2 has the value $U2+(1-\alpha 2)B2$, and resulting pixel R3 has the value $U3+(1-\alpha 3)B3$.

In summary, the pixel manipulation scheme shown in FIG. 8 combines alpha generation and multiplication for each pixel in an overlay image with "upscaling" of the overlay to match the resolution of a high resolution background image. The premultiplication with alpha and interpolation functions ("upscaled" image 802 of FIG. 8) can be performed using circuit 605, 613 and 614 of FIG. 6. The blending function (see resulting image 804 of FIG. 8) can be performed using circuits 620 and 621 of FIG. 6.

Figure 9:
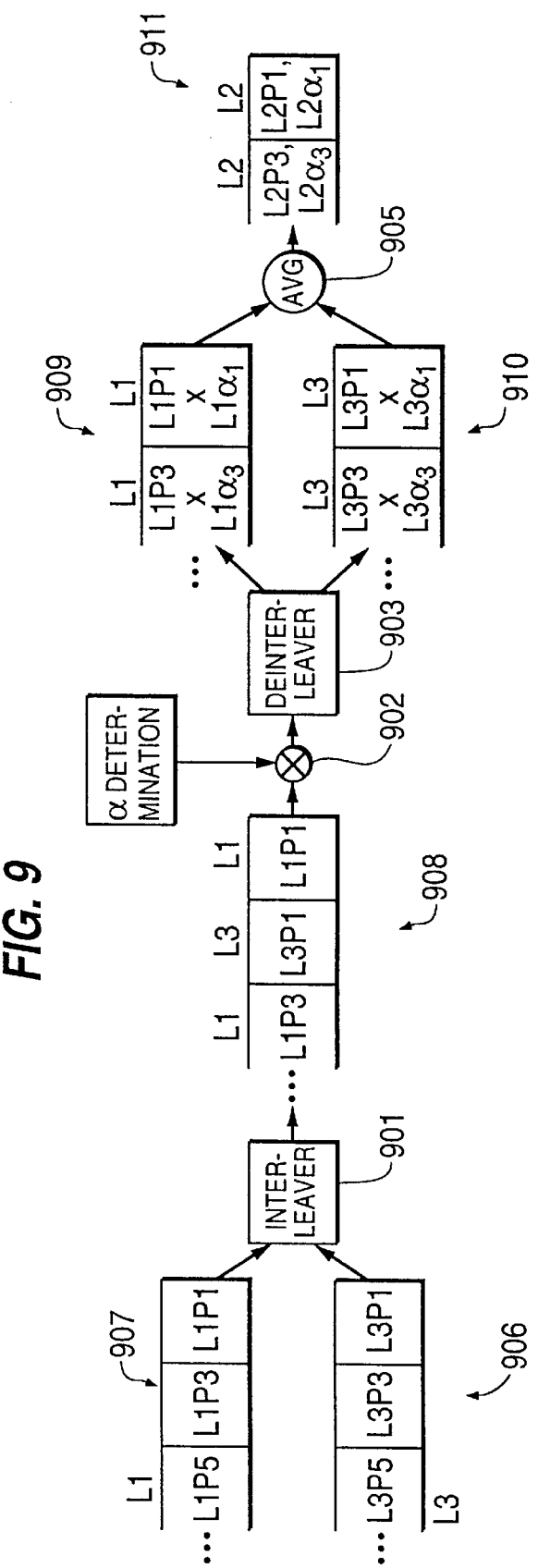
FIG. 9 shows how two horizontal lines from an image can be efficiently averaged to create a third line, including multiplying pixels by a corresponding alpha value.

FIG. 9 shows how two vertical lines from an image can be efficiently averaged to create a third line, including multiplying pixels by a corresponding alpha value. The technique shown in FIG. 9 generally parallels that described with reference to the circuit of FIG. 6.

In FIG. 9, a first pixel train 907 corresponding to LINE 1 of an input image comprises pixels L1P1, L1P3, and L1P5. Similarly, a second pixel train 906 corresponding to LINE 3 (i.e., the second line) of an input image comprises pixels L3P1, L3P3, and L3P5. Each pixel train is fed to an interleaver 901 which produces a single pixel stream 908 comprising alternate successive pixels from each line. The use of an interleaver reduces the number of components required to perform color look-up (not shown in FIG. 9) and multiplication by multiplier 902 (corresponding to multiplier 610 in FIG. 6).

An alpha determination circuit 904 generates alpha values for each pixel according to the techniques described previously, such that the pixel train leaving multiplier 902 includes pixels which have been multiplied by their corresponding alpha values. The single pixel train leaving multiplier 902 is passed to a deinterleaver 903 which segregates the pixel train back into two separate pixel trains 909 and 910, each corresponding to a horizontal line of the input image. Thereafter, the two pixel trains are averaged in averaging circuit 905 (corresponding to element 616 in FIG. 6) and an output pixel train 911 comprising averaged pixels and alpha values is generated. Each of pixel trains 909, 910, and 911 can be subsequently fed to a horizontal interpolation circuit such as that shown in FIG. 3A.

It is apparent that many modifications and variations of the present invention are possible, and references to specific values are by example only. As one example, where multiple circuits are described or claimed to perform a function, the same function can be achieved in substantially the same manner by using a smaller number of circuits which are multiplexed with a higher clock rate. It is, therefore, to be understood that within the scope of the appended claims the invention may be practiced otherwise than as specifically described.

We claim:

1. Apparatus for converting a first image having a first display resolution to a second image having a second display resolution, the first image comprising a plurality of pixel values arranged into horizontal lines, the apparatus comprising:

a pixel replicator which receives a pixel train comprising pixel values from one of the horizontal lines of the first image and generates therefrom a replicated pixel train comprising replicated pixel values from the one horizontal line;

a delay element, coupled to the pixel replicator, which delays the replicated pixel train by one clock cycle to create a delayed replicated pixel train; and an averaging circuit which receives the replicated pixel train and the delayed replicated pixel train, averages corresponding pixel values from the replicated pixel train and the delayed replicated pixel train, and outputs an averaged pixel train comprising pixel values from the one horizontal line interspersed with averaged pixel values from the one horizontal line.

2. The apparatus according to claim 1, further comprising means for, prior to receipt by the pixel replicator, multiplying each respective pixel value in the pixel train with an alpha blending value which controls the translucency of the respective pixel value.

3. The apparatus according to claim 2, wherein the multiplying means comprises means for retrieving the alpha blending value from an alpha register according to an alpha control bit associated with each respective pixel value.

4. The apparatus according to claim 2, wherein the multiplying means comprises means for retrieving the alpha blending value from a look-up table according to a plurality of encoded alpha control bits associated with each respective pixel value.

5. The apparatus according to claim 2, further comprising means for, responsive to a favorable comparison between each respective pixel value and a chroma keying value, forcing a multiplication of the respective pixel value by zero.

6. The apparatus according to claim 1, wherein each of the pixel values in the first image comprises a plurality of color components, and wherein the pixel replicator, the delay element, and the averaging circuit are duplicated for each color component, such that a separate averaged pixel train is produced for each color component.

7. The apparatus according to claim 1, wherein each of the pixel values in the first image has associated therewith an alpha blending value which determines the degree to which that pixel value will be blended with a corresponding pixel value from a third image, the apparatus further comprising:

means for receiving a second pixel train comprising alpha blending values from the one horizontal line of the first image and generating therefrom a second replicated pixel train comprising replicated alpha blending values;

means, coupled to the second pixel replicator, for delaying the replicated alpha blending values train by one clock cycle to create a delayed replicated alpha blending value train; and means for receiving the replicated alpha blending value train and the delayed replicated alpha blending value train, averaging corresponding elements from the replicated alpha blending value train and the delayed replicated alpha blending value train, and outputting therefrom an averaged alpha blending value train comprising elements from the alpha blending value train interspersed with averaged elements from the alpha blending value train.

8. The apparatus of claim 1, further comprising means for interpolating alpha blending values associated with each of the plurality of pixels in the first image and generating therefrom interpolated alpha blending values.

9. The apparatus of claim 1, wherein the pixel replicator comprises a register which is clocked at twice the speed of the pixel train.

10. A method for converting a first image having a first display resolution to a second image having a second display resolution, the first image comprising a plurality of pixel values arranged into horizontal lines, the method comprising the steps of:

(1) replicating a pixel train comprising pixel values from one of the horizontal lines of the first image and generating therefrom a replicated pixel train comprising replicated pixel values from the one horizontal line;

(2) delaying the replicated pixel train by one clock cycle to create a delayed replicated pixel train; and (3) averaging corresponding pixel values from the replicated pixel train and the delayed replicated pixel train, and outputting therefrom an averaged pixel train comprising pixel values from the one horizontal line interspersed with averaged pixel values from the one horizontal line.

11. The method according to claim 10, further comprising the step of, prior to receipt by the pixel replicator, multiplying each respective pixel value in the pixel train with an alpha blending value which controls the translucency of the respective pixel value.

12. The method according to claim 11, wherein the multiplying step comprises the step of retrieving the alpha blending value from an alpha register according to an alpha control bit associated with each respective pixel value.

13. The method according to claim 11, wherein the multiplying step comprises the step of retrieving the alpha blending value from a look-up table according to a plurality of encoded alpha control bits associated with each respective pixel value.

14. The method according to claim 11, further comprising the step of comparing each respective pixel value with a chroma keying value and, responsive to a favorable comparison, forcing a multiplication of the respective pixel value by zero.

15. The method according to claim 10, wherein each of the pixel values in the first image comprises a plurality of color components, and wherein steps (1), (2), and (3) are separately performed for each color component, such that a separate averaged pixel train is produced for each color component.

16. The method according to claim 10, wherein each of the pixel values in the first image has associated therewith an alpha blending value which determines the degree to which that pixel value will be blended with a corresponding pixel value from a third image, the method further comprising the steps of:

(4) receiving a second pixel train comprising alpha blending values from the one horizontal line of the first image and generating therefrom a second replicated pixel train comprising replicated alpha blending values;

(5) delaying the replicated alpha blending values train by one clock cycle to create a delayed replicated alpha blending value train; and (6) receiving the replicated alpha blending value train and the delayed replicated alpha blending value train, averaging corresponding elements from the replicated alpha blending value train and the delayed replicated alpha blending value train, and outputting therefrom an averaged alpha blending value train comprising elements from the alpha blending value train interspersed with averaged elements from the alpha blending value train.

17. The method of claim 10, further comprising the step of interpolating alpha blending values associated with each of the plurality of pixels in the first image and generating therefrom interpolated alpha blending values.

18. The method of claim 10, wherein step (1) comprises the step of using a register to clock the pixel train at twice its normal clock rate.

19. The method of claim 10, further comprising the step of averaging pixels from two different horizontal lines of the first image to produce an averaged line of pixels, and using the averaged line of pixels as the one horizontal line which is replicated in step (1).

20. Apparatus for combining pixels from a first image having a first display resolution with pixels from a second image having a second display resolution, comprising:

alpha value determining means for determining an alpha value which controls the translucency of each pixel in the first image;

pixel averaging means for generating interpolated pixel values from the first image by averaging adjacent pixel values from the first image;

alpha value averaging means for generating interpolated alpha values by averaging corresponding adjacent alpha values determined by the alpha value determining means, wherein each interpolated pixel value has an associated interpolated alpha value; and blending means for blending each interpolated pixel value and its associated interpolated alpha value with a corresponding pixel value from the second image.

21. The apparatus of claim 20, wherein the alpha value determining means reads from a memory distinct alpha blending bits associated with each pixel in the first image.

22. The apparatus of claim 20, wherein the alpha value determining means uses an alpha control bit associated with each pixel in the first image to retrieve a predetermined alpha value.

23. The apparatus of claim 20, further comprising means for comparing each pixel value in the first image with a chroma keying value and, responsive to a determination that a match has occurred, forces the alpha value for a corresponding pixel value to be zero.

24. The apparatus of claim 20, further comprising means for multiplying each pixel value in the first image by its associated alpha value prior to generating the interpolated pixel values.

25. A method of combining pixels from a first image having a first display resolution with pixels from a second image having a second display resolution, comprising the steps of:

(1) determining, for each pixel in the first image, an alpha value which controls the translucency of that pixel;

(2) generating interpolation pixels from the first image by averaging pixel values from the first image;

(3) generating interpolation alpha values from the first image by averaging corresponding alpha values determined in step (1); and (4) blending the interpolation pixels generated in step (3) with corresponding pixels from the second image.

26. The method of claim 25, wherein step (1) comprises the step of reading from a memory distinct alpha blending bits associated with each pixel in the first image.

27. The method of claim 25, wherein step (1) comprises the step of using an alpha control bit associated with each pixel in the first image to retrieve a predetermined alpha value.

28. The method of claim 25, further comprising the step of comparing each pixel value in the first image with a chroma keying value and, responsive to a determination that a match has occurred, forcing the alpha value for that pixel value to be zero.

29. The method of claim 25, further comprising the step of multiplying each pixel value in the first image by its associated alpha value prior to generating the interpolated pixel values.

30. Apparatus for interpolating pixels in a display image comprising a plurality of horizontal lines of pixels, the apparatus comprising:

an interleaver which receives a first pixel train comprising pixels from a first line of the input image and a second pixel train comprising pixels from a second line of the input image and generates an output an interleaved pixel train comprising interleaved pixels from the first and second pixel trains;

means for determining an alpha blending value for each pixel in the interleaved pixel train, wherein the alpha blending value specifies a degree of transparency for each pixel;

a multiplier which multiplies each pixel in the interleaved pixel train with its determined alpha blending value, and produces therefrom an interleaved pixel train comprising premultiplied pixels;

a deinterleaver which deinterleaves the interleaved pixel train comprising premultiplied pixels into a first premultiplied pixel train and a second premultiplied pixel train; and an averaging circuit which averages corresponding pixel values from the first and second premultiplied pixel trains and outputs therefrom an interpolated line of pixels.

31. Apparatus for combining a first image comprising a first plurality of pixels with a second image comprising a second plurality of pixels, each of the first plurality of pixels comprising a displayable pixel value and an alpha control bit which controls the translucency of the displayable pixel value, the apparatus comprising:

an alpha generation circuit, responsive to the alpha control bit of each pixel in the first image and to a chroma comparison circuit which is responsive to each displayable pixel value in the first image, for generating an alpha value comprising a value selected from the set consisting of 0, 1, and a predetermined value $\alpha$;

multiplying means, coupled to the alpha generation circuit, for multiplying each generated alpha value by a corresponding displayable pixel value from the first image and generating therefrom a premultiplied displayable pixel value; and a horizontal interpolation circuit, coupled to the multiplying means, for generating interpolation pixels from two premultiplied pixel values and for generating interpolation alpha values from two alpha values.

32. The apparatus of claim 31, further comprising a vertical interpolation circuit, coupled between the multiplying means and the horizontal interpolation circuit, for generating interpolation pixels from two premultiplied pixel values.

33. The apparatus of claim 31, wherein the horizontal interpolation circuit comprises an adder and a register which is clocked at twice the speed of an incoming pixel train.

34. The apparatus of claim 31, further comprising an adder, coupled to the output of the horizontal interpolation circuit, for adding each interpolated pixel with a corresponding displayable pixel value from the second image which has been premultiplied by $1-\alpha$.

35. The apparatus of claim 31, wherein the apparatus can operate in one of three modes: (1) RGB mode, wherein each displayable pixel value comprises separate color components for red, green and blue; (2) CLUT mode, wherein each displayable pixel value comprises color bits which are converted into RGB components using a color look-up table prior to being multiplied by the multiplying means; and (3) ACLUT mode, wherein each pixel in the first image comprises a plurality of alpha control bits which are used instead of the alpha value generated by the alpha generation circuit to control translucency.

* * * * *